March 18, 1969  R. SWITLIK  3,433,342

INFLATABLE EVACUATION SLIDE

Filed Feb. 1, 1968

INVENTOR
RICHARD SWITLIK
BY
Curtis, Morris + Safford
ATTORNEYS

March 18, 1969   R. SWITLIK   3,433,342
INFLATABLE EVACUATION SLIDE
Filed Feb. 1, 1968   Sheet 2 of 2
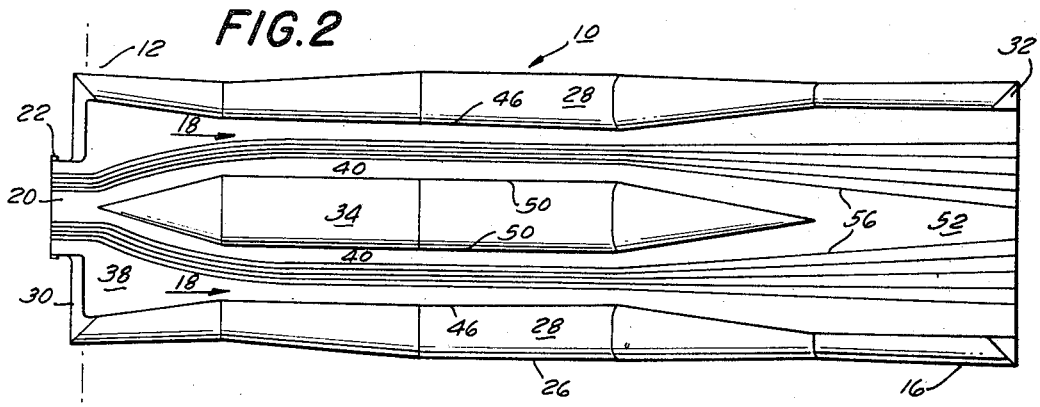
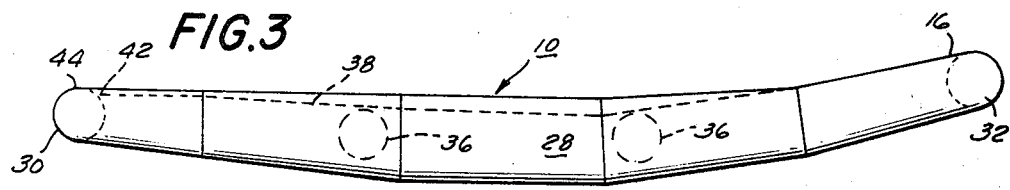
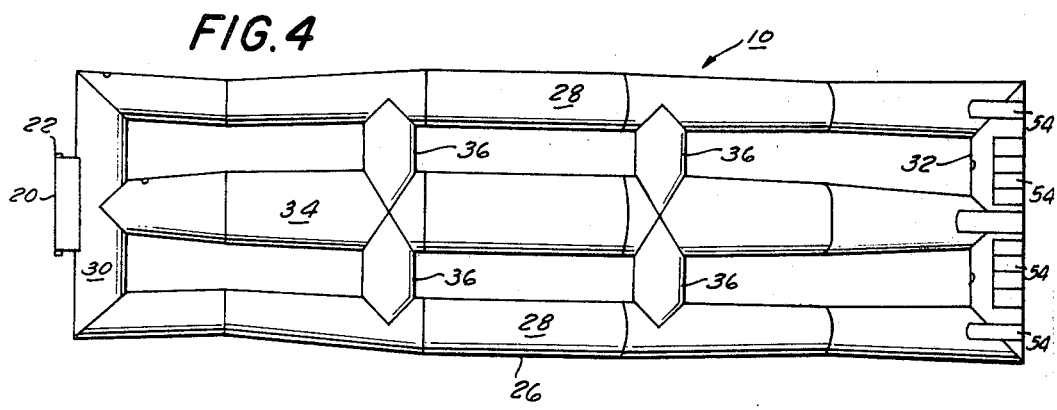
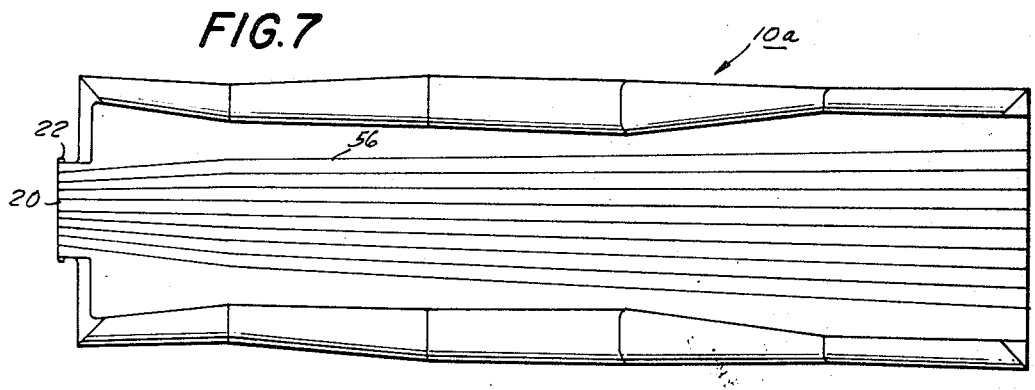
INVENTOR
RICHARD SWITLIK
BY
Curtis, Morris & Safford
ATTORNEYS United States Patent Office 3,433,342
Patented Mar. 18, 1969

3,433,342
INFLATABLE EVACUATION SLIDE
Richard Switlik, Allentown, N.J., assignor to Switlik
Parachute Company, Inc., Trenton, N.J.
Filed Feb. 1, 1968, Ser. No. 702,219
U.S. Cl. 193—25                                    9 Claims
Int. Cl. B65g 11/10; B64c 1/22; B64d 9/00

ABSTRACT OF THE DISCLOSURE

An inflatable evacuation slide for use with an aircraft, the slide having an inflatable support frame including longitudinal support members which have interior restrainers. The restrainers cause the depth of the support members along the extent of their major axis to be greater than the width along their minor axis, the increase depth increasing the support members resistance to deflection.

---

Figure 1:
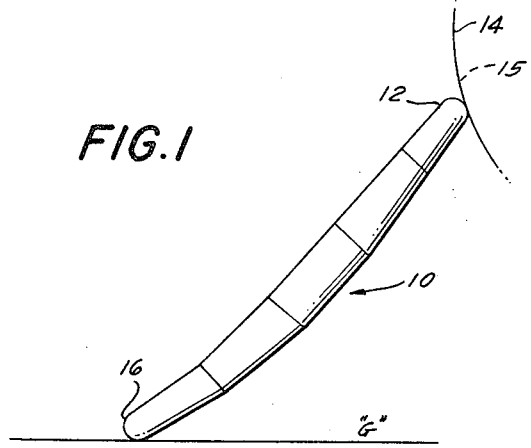

The present invention relates to inflatable evacuation slides and in particular to slides which are for use with aircraft when passengers and crew must escape rapidly at the time of a forced landing or other emergency.

The use of inflatable evacuation slides for escaping from aircraft after crashes or forced landings is well established and prior art slides have generally been useful with most passenger aircraft. However, as aircraft have become larger and the escape doors on the aircraft higher above the ground, problems with slide constructions have been encountered. One of the more important problems has been the structural deflection or bending of the slide. Since slids generally have had an unsupported span from the escape door to the ground, the slide has had to function as an end supported beam.

It is also necessary that the slide roll up or pack in a deflated condition into as small a volume as possible since aircraft space is at a premium. Accordingly, for easy packing the slides are usually made from fabric impregnated with rubber or other flexible impervious material. The longitudinal support members of the slides are inflatable and, as far as it is known, have a circular cross sectional periphery.

As the required clear span from the aircraft to the ground increases, the diameter of the longitudinal support members also must increase to provide the required resistance to deflection caused by the bending moment resulting from the weight of the escaper sliding down the slide.

A further problem is that the large increase in the number of passengers to the range of 300 to 400 or more which aircraft may carry raises the question of how can such large numbers be quickly evacuated. Providing a double slide area so that two persons may use the slide side by side also doubles the bending moment which must be considered. With the bending moment doubled, the longitudinal support members must also be increased in diameter and number to prevent too great a deflection or collapse of the slide. The result is an unwieldy slide structure with a minimum of slide area and doubtful practicality.

Accordingly, it is an object of the present invention to provide an evacuation slide for aircraft which has longitudinal support members of sufficient strentgh in bending to adequately support persons escaping from the aircraft. It is another object to provide support members which, while having sufficient strength, are not unwieldy or impractical.

A further object is to provide an evacuation slide which is safe to use yet economical to manufacture.

Still another object is to provide an evacuation slide which may be converted to a compartmentized life raft after it has served its function as an escape means when an aircraft has crashed or landed in water.

In the accompanying drawings and in this specification, two embodiments of the present invention have been shown and are discussed by way of example. However, they are not intended to be limiting of this invention, but are primarily intended to teach those skilled in the art the nature of the invention so that it may be adapted in various forms as will be obvious to them, but within the scope of the appended claims.

Figure 5:
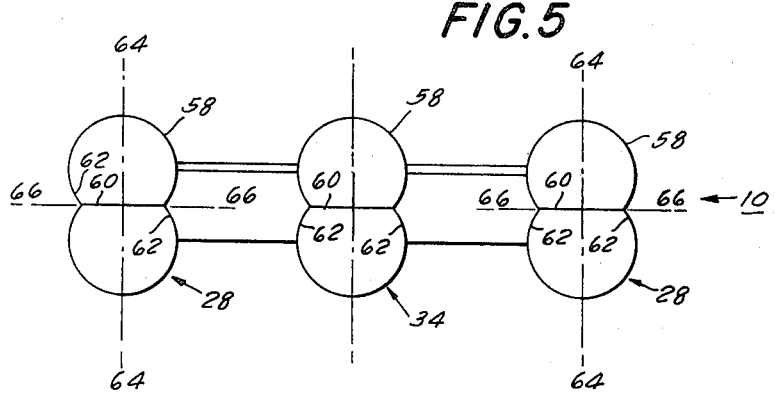
Figure 6:
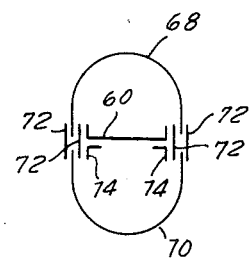

In the drawings:
FIGURE 1 is a side schematic view of an evacuation slide of the present invention shown in relation to an aircraft and to the ground;
FIGURE 2 is a top view of an evacuation slide of the present invention;
FIGURE 3 is a side view of the slide of FIGURE 2;
FIGURE 4 is a bottom or under side view of the slide of FIGURE 2;
FIGURE 5 is a schematic sectional view taken along lines 5—5 of FIGURE 3;
FIGURE 6 is a schematic slightly exploded cross sectional view showing the components of the side support members of the evacuation slide of FIGURE 2; and
FIGURE 7 is a top view of an evacuation slide in accordance with the present invention but having only one slideway.

Referring to the drawings and to FIGURE 1 in particular, an evacuation slide structure 10 is shown attached at its head end 12 to an aircraft 14 and adjacent to a door or escape opening 15. The foot end 16 of the slide structure rests on the ground G.

The angle which the slide structure 10 makes with the ground may vary between about 20° to 65° depending on the position and orientation of the aircraft.

With the coming of the larger aircraft, such as the Boeing 747, the length of slides will of necessity be extended to about 28 feet due to the height of the aircraft cabin above the ground and to keep the angle of the slide within the practical limits for passenger use. Since the slide structure is unsupported except at its head end 12 and foot end 16 the slide itself must be able to resist the bending moment generated by the persons sliding down the slide.

As shown in FIGURES 2–6, the slide structure 10 of the present invention has a unique construction which provides unusual strength for a slide having a long span. The slide 10 illustrated in these figures has two slideways 18. This means that two persons can leave the aircraft side by side, thus permitting the evacuation to take place in one half the usual time where only one slideway is provided.

The slide 10 has at its head end 12 a fastening sheet 20 on which is fitted a holding bar 22. The bar 22 is secured to the aircraft 10 at the escape opening 15 shown in phantom lines. Means of securing the holding bar 22 are well known in the art and is not shown.

As stated previously the slide structure 10 is made primarily from a flexible fabric impregnated with rubber or other flexible impervious material to render it airtight when various portions are inflated. The slide 10 includes a support frame 26 comprising side support members 28, a head member 30, and a foot member 32. In addition an intermediate support member 34 is also provided in the illustrated slide. To brace the support frame 26, thwarts 36 are placed transverse to the longitudinally extending side members 28 and the intermediate member 34.

The side members 28, head member 30, foot member 32, intermediate member 34 and thwarts 36 are all inflatable. In actual use they are inflated to a pressure of 1.5 to 2.0 p.s.i., depending on the materials and construction used.

A slide surface is provided by a flexible fabric sheet 38 which is attached to the various members of the support frame 26. As shown in FIGURE 2 in particular, the sheet 38 is divided into two main portions 40 forming the two slideways 18 which serve as lanes for the aircraft evacuees.

When the support frame is inflated to the proper pressure the sheet 38 is drawn taut. The upper end 42 of the sheet is preferably positioned below the upper edge 44 of the head member 30. This positioning has the advantage of providing a depression into which the evacuee may quickly fit giving him a safe position for the slide down the slideway 18. It has the further advantage of providing psychological comfort to the user since it provides immediate slide movement protection.

The outer longitudinal edges 46 are attached to the side support members 28 as shown in FIGURE 2. The inner edges 50 are secured to the intermediate support 34 in substantially the same manner.

The lower portion 52 of the sheet is tautly passed tangentially over the foot member 32. This tautness and flatness at the bottom has a tendency to bounce the evacuees off, thus permitting continuous use of the slide without the necessity of waiting for each person to crawl off.

To prevent wear on the foot member chafing strips 54 of abrasion resistant material may be used where the member rubs on the ground.

Since the evacuees may generate a static electrical charge on the slideway 40 during their descent, conductive tapes 56 may be used to dissipate any such charges. This is a precaution against an accidental spark which may set off an explosion if fuel is spilled at the crash or landing site.

As stated previously, the long span of the side members 28 presents a problem of providing a sufficient rigidity to prevent collapse of the slide due to the bending moment and deflection created by the evacuees descending down the slideways 40. If the bending moment becomes too great, the slide will sag and not only hold the person trying to escape but trap the others within the aircraft since the slide will be unusable.

Since merely increasing the diameter of the side members 28 is not practical another solution is necessary. In accordance with the present invention as shown in FIGURES 5 and 6, the side members 28 have a non-circular cross-sectional periphery. The periphery 58 is a pseudo "figure-8" shape. This shape is attained by means of a substantially nonextensible restrainer 60 which is fixed to the interior side walls 62 of members 28.

The restrainer 60 thus causes the members 28 to have a major axis 64—64 and a minor axis 66—66. As can be noted in FIGURE 5, the depth of the side members 28 is substantially greater than their width. By increasing the depth, the members 28 have an increased resistance to deflection when comparing a side member of circular shape having a circumference substantially equal to the periphery of the side members of the present invention. Since it is the excessive deflection of the side members which causes the sag or collapse of the slide, the present invention gives added strength and carrying capacity without any increase in the total periphery extent of the members.

Although the section in FIGURE 5 is shown as a pseudo "figure-8" it is to be understood that it may be of other elongated configurations such as elliptical.

The position of the restrainer 60 along the major axis 64—64 determines the internal stability of the shape of the side members 28. Preferably the restrainer is positioned in the range of one quarter the distance from the top of the member 28 to one quarter the distance from the bottom of the member.

A restrainer 60 may also be provided in the intermediate member 34.

While only one restrainer 60 has been shown in each member added restrainers may be used to further stabilize the configuration.

The restrainer 60 may advantageously be formed of a continuous flexible fabric impregnated with rubber or other flexible impervious material to render it air and watertight. By this arrangement the side members 28 are divided into two compartments, each of which is air and watertight. Such a construction permits the slide structure to serve the added function of a life raft in the event the aircraft crashes or force lands in water.

If compartmentizing is not desired, the restrainer 60 may be of an open grid or other type of construction.

In FIGURE 6, the components of the side support member are shown. These include an upper half 68, a lower half 70, side splices 72, the restrainer 60 and a V-tape sealing strip 74.

The present invention as stated previously may also be used with a slide having a single slideway 40. Such an embodiment is shown in FIGURE 7.

The slide 10a of FIGURE 7 is constructed substantially in the same manner as slide 10 described previously. The major difference is the elimination of the intermediate support 34 so that only one slideway 18a is provided. The side supports 28a have the same cross-sectional periphery as shown in FIGURES 5 and 6.

The means of inflating the slide by use of an aspirator is not shown as such apparatus is well known to those skilled in the art.

While the objects of the present invention as set out hereinbefore have been accomplished by the illustrated embodiments, others will be apparent from the foregoing description.

I claim:

1. An evacuation slide structure adapted to depend from an aircraft and comprising at least two inflatable tubular longitudinal side support members and at least two inflatable tubular end support members, said members connected together to provide a support frame, a fabric sheet secured to said support frame to form a surface for a slideway, each of said side members having top, bottom and side wall portions and a transverse cross sectional periphery which is non-circular and defines major and minor axis, a restrainer contained within each of said side members and connected to the side wall portions of the side member whereby the side wall portions of each side member are in a fixed and closer relationship to each other than the top and bottom portions of said member to each other when the members are inflated, said major axis extending between the top and bottom portions of the member and said minor axis extending between the side wall portions thereof.

2. An evacuation slide structure as defined in claim 1 and further including at least one thwart member connected to each side support member and underlying the fabric sheet.

3. An evacuation slide structure as defined in claim 1 wherein the restrainer is impervious and substantially non-extensible and cooperates to divide each side support member into at least two air and watertight compartments.

4. An evacuation slide structure as defined in claim 1 wherein the restrainer is positioned along the extent of the major axis in the range of one quarter the distance from the top to one quarter the distance from the bottom.

5. An evacuation slide structure as defined in claim 1 and further including at least one intermediate longitudinal support member positioned between the side support members and supporting the fabric sheet whereby a pair of slideways are defined.

6. An evacuation slide structure as defined in claim 1 and further including at least one inflatable thwart member connected to each side support member and underlying the fabric sheet.

7. An evacuation slide structure adapted to depend from an aircraft and comprising at least two inflatable tubular longitudinal side support members and at least two inflatable tubular end support members connected together to provide a support frame, one end member adapted to be connected to the aircraft, a fabric sheet secured to said support frame to form a slide surface for a slideway, said support frame members having an impervious surface making them air and watertight, each of said side members having top, bottom and side wall portions and a transverse cross-sectional periphery which is non-circular and defines major and minor axis, a restrainer contained within each of said side members and connected to the side wall portions of the side member whereby the sidewall portions of each side member are in a fixed and closer relationship to each other than the top and bottom portions of said member to each other when the members are inflated, said major axis extending between the top and bottom portions of the side member and said minor axis extending between the side wall portions thereof, said restrainer positioned along the extent of the major axis in the range of one quarter the distance from the top to one quarter the distance from the bottom portions.

8. An evacuation slide structure as defined in claim 7 and further including at least one intermediate longitudinal support member positioned between the side support members and supporting the fabric sheet whereby a pair of slideways are defined.

9. An evacuation slide structure as defined in claim 7 wherein the restrainer is impervious and substantially non-extensible and cooperates to divide each side support member into at least two air and watertight compartments.

References Cited

UNITED STATES PATENTS

| | | |
|---|---|---|
| 3,070,203 | 12/1962 | Hailstone. |
| 3,092,232 | 6/1963 | Adams. |
| 3,102,623 | 9/1963 | Schacht et al. |
| 3,370,684 | 2/1968 | Holcombe. |

ANDRES H. NIELSEN, *Primary Examiner.*

U.S. Cl. X.R.

244—137